(12) United States Patent
Kudelia

(10) Patent No.: US 12,738,823 B2
(45) Date of Patent: Sep. 15, 2026

(54) ELECTRIC MACHINE

(71) Applicant: Valerii Oleksiiovych Kudelia, Pidhorodne (UA)

(72) Inventor: Valerii Oleksiiovych Kudelia, Pidhorodne (UA)

( * ) Notice: Subject to any disclaimer, the term of this patent is extended or adjusted under 35 U.S.C. 154(b) by 216 days.

(21) Appl. No.: 18/626,357

(22) Filed: Apr. 4, 2024

(65) Prior Publication Data

US 2025/0317038 A1 Oct. 9, 2025

(51) Int. Cl.
*H02K 16/02* (2006.01)
*H02K 7/116* (2006.01)

(52) U.S. Cl.
CPC ............. *H02K 16/02* (2013.01); *H02K 7/116* (2013.01)

(58) Field of Classification Search
CPC ............... H02K 16/02; H02K 2201/12; H02K 2213/06; H02K 7/116
See application file for complete search history.

(56) References Cited

U.S. PATENT DOCUMENTS

2003/0048034 A1 3/2003 Furuse et al.
2015/0357891 A1 * 12/2015 Ichiyama ............. H02K 21/029 310/114
2022/0407375 A1 * 12/2022 Liu ........................ H02K 21/12

FOREIGN PATENT DOCUMENTS

UA 125556 C2 * 4/2022

OTHER PUBLICATIONS

Machine translation of UA-125556-C2 retrieved Dec. 27, 2025.*

* cited by examiner

*Primary Examiner* — Christopher M Koehler
*Assistant Examiner* — Riley Owen Stout

(57) ABSTRACT

An electric machine comprises: a stator (2); a first rotor (3) and a second rotor (4), which are mounted with the ability of mutual rotation relative to each other; a differential comprising a planet pinion (5) mounted with the ability to determine the mutual rotation of the first and the second rotors (3, 4); a first and a second sun gears (6, 7) fixedly mounted on the first and the second rotors (3, 4); a magnetic flux regulator with a nonmoving part (8, 9) and a moving part (10) mechanically connected to the planet pinion (5) and configured to interact with the nonmoving part (8, 9); a mechanical power transmission link (14); and an auxiliary rotor (13) fixedly connected to the mechanical power transmission link (14), wherein the first rotor (3) and the second rotor (4) are mounted radially with gaps between the stator (2) and the auxiliary rotor (13).

6 Claims, 2 Drawing Sheets

ELECTRIC MACHINE

The invention relates to electrical engineering, in particular to the design of electric machines with permanent magnets, and can be used as an electric motor and as an electric generator in land-based and flying vehicles, industrial processes, mining industries, facilities of storing and generating electrical energy, other industries where advanced (multiple) rotation speed control by the characteristic of constant power etc. is required.

A solution working according to the axial scheme is known from the US patent document No. 20030048034A1 (published on 13 Mar. 2003), which describes an electric motor comprising a housing with a stator mounted therein, having a first and a second disk rotors positioned opposite each other at the axial ends of the stator with axial gaps for rotation around its axis.

The closest prior art of the claimed solution is the solution described in the patent of Ukraine No. 125556C2 (published on 20 Apr. 2022), where a traction electric drive and a method for its regulation are disclosed. In particular, the patent describes a traction electric drive comprising a stator with windings; two rotors with permanent magnets, which are mounted with axial gaps relative to the stator and mounted with the ability of mutual rotation relative to each other by a limited adjustable angle; a differential comprising at least one planet pinion mounted with the ability to determine mutual rotation of the rotors; sun gears fixedly mounted on the rotors, each sun gear being mechanically connected to the planet pinion; a magnetic flux regulator with a nonmoving part and a moving part connected to the planet pinion and configured to contactlessly interact with the nonmoving part of the magnetic flux regulator; and a control system connected with the magnetic flux regulator.

The disadvantages of these technical solutions are the complexity of the structural design of the machines, the presence of axial gaps that provoke axial parasitic mechanical oscillations of the rotors, and the relatively low accuracy and multiplicity of magnetic flux regulation.

Thus, the purpose of the claimed invention is to develop an electric machine, the design of which ensures achievement of a technical result consisting in reducing the axial parasitic mechanical oscillations of the rotors, allows to increase the accuracy and multiplicity of magnetic flux regulation, and also allows to make it easier to control the electric machine.

The purpose is achieved by developing an electric machine comprising: at least one stator with windings; a first rotor and a second rotor with permanent magnets, which are mounted with the ability of mutual rotation relative to each other by a limited adjustable angle, where the number of mentioned pairs of rotors is equal to the number of stators; at least one differential comprising at least one planet pinion mounted with the ability to determine mutual rotation of the first and the second rotors; a first and a second sun gears fixedly mounted on the first and the second rotors, each sun gear being mechanically connected to each planet pinion; a magnetic flux regulator with at least one nonmoving part and with at least one moving part mechanically connected to each planet pinion and configured to contactlessly interact with the nonmoving part of the magnetic flux regulator; a mechanical power transmission link; and a control system connected with the nonmoving part of the magnetic flux regulator and with the stator; wherein the electric machine comprises an auxiliary rotor fixedly connected to the mechanical power transmission link, wherein the first rotor and the second rotor are mounted radially with gaps between the stator and the auxiliary rotor.

Thus, unlike the prototype, the concept of axial magnetic flux is replaced by the concept of transverse magnetic flux. The auxiliary rotor is mounted such that each of the first and second rotors with permanent magnets is in a holding (stabilizing) magnetic field that acts between the stator and the auxiliary rotor, and the magnetic forces acting in the magnetic system do not provoke axial parasitic mechanical oscillations of the rotating rotors.

The auxiliary rotor provides for a more accurate addition of magnetic fluxes from the first and the second rotors while preserving the initial phase of the resulting magnetic flux along the rotation angle relative to the mechanical power transmission link in the range of operating speeds, which increases the accuracy of the operation of the rotor position sensor, if it is present, and makes it easier to control the electric machine.

In one of the preferred embodiments (implementations), the auxiliary rotor is mounted around the inner periphery of the first and the second rotors, and the stator is mounted around the outer periphery of the first and the second rotors. In this case, the electric machine can be considered as an interior rotor machine.

In another preferred embodiment (implementation), the auxiliary rotor is mounted around the outer periphery of the first and the second rotors, and the stator is mounted around the inner periphery of the first and the second rotors. In this case, the electric machine can be considered as an exterior rotor machine.

The first and the second rotors and the auxiliary rotor are mounted with the ability of controllable magnetic flux regulation such that a part of the magnetic flux from the permanent magnets of the first and the second rotors, which is proportional to the angle of their mutual rotation, passes through the auxiliary rotor in such a way that it does not interact with the stator windings and does not generate torque and back electro-motive force (BEMF). Thus, the magnetic flux is controllably divided in a variable ratio into a part that generates torque and BEMF and a part that does not generate torque and BEMF, that is, the auxiliary rotor directs a part of the magnetic flux to itself, thereby increasing the multiplicity and accuracy of the regulation of the main magnetic flux associated with the stator windings, for example, in the range to 5× (the boundary value of 7.5× was obtained on a layout).

It should be noted that in the claimed electric machine, as the rotation speed increases, the main magnetic flux decreases, and BEMF does not increase, as in an electric machine without magnetic flux regulation, which will allow an interested developer to increase the speed output and, accordingly, the power at medium and low loads, eliminating the risks associated with field weakening along the D axis via the magnetic flux caused by stator currents and/or without increasing the power voltage and adding complexity to the power electronics. The stator with windings can be structurally positioned outwards relative to the rest of the elements, which makes it easier to cool it efficiently to increase the power output.

In the scope of this description, the controllable division of the magnetic flux suggests that there is a part of the electric machine magnetic flux that generates torque and BEMF and there is a passive part that does not generate torque and BEMF, and the proportion between the parts of the magnetic flux is changed controllably.

In an electric machine with axial magnetic flux, it is also possible to increase the multiplicity of magnetic flux regulation by mounting additional magnetic screens, but there remains the technological problem of a risk of axial parasitic oscillations of rotating rotors, and magnetic flux regulation in common machines with radial magnetic flux is technologically complex and not justified for mass production and use.

Preferably, the radial gaps between the auxiliary rotor and the first rotor and the second rotor are equal to or smaller than the radial gaps between the first rotor and the second rotor and the stator. An option where gaps are reduced is explained as follows. The first and the second rotors and the auxiliary rotor rotate generally synchronously with a possibility of mutual slippage to a limited angle, and the design can be implemented with a minimum gap between them to ensure minimal magnetic flux loss and more efficient use of permanent magnets. Thus, a possible design flaw associated with four gaps in the magnetic flux path will be compensated.

Generally synchronous rotation suggests that the first and the second rotors, while rotating, can change the phase relative to the auxiliary rotor, but the relative speed of rotation of the rotors is significantly lower than the speed of rotation of each of them individually (in this context, the first and the second rotors are perceived as a single whole). The phase of the magnetic flux, which is the sum of the magnetic fluxes of the first and the second rotors, will coincide with the phase of the auxiliary rotor and the mechanical power transmission link.

The claimed electric machine can be regarded as a functional combination of a conventional electric machine and a stepless gear box, which is more energy efficient and significantly cheaper than using two separate units. Or, in other words, the claimed electric machine in its unchanged dimensions combines continuously plenty of electric machines, in which the value of the main magnetic flux is in a range from the maximum to the justified minimum.

Also, the claimed machine allows to build an electric hybrid propulsion system that is adjusted to the current characteristics of an internal combustion engine (ICE), allowing to constantly optimize the use of ICE for any value of power output in the operating range in order to reduce fuel consumption and environment pollution, taking into account operational changes in the characteristics of ICE.

Furthermore, the claimed machine allows to build a multi-wheeled vehicle with electric axial and interaxial differentials with extended functions due to the ability to regulate the main magnetic flux, which significantly improves the controllability and off-road performance of a land-based vehicle and does not block the movement of a multi-wheeled vehicle in case of failure in one or simultaneously several wheel drives.

The design of the electric machine is characterized by reduced vulnerability to short circuits in the stator winding, which increases the survivability of a flying vehicle in which this invention is used.

Contactless interaction between the moving and the nonmoving parts of the magnetic flux regulator can be, for example, magnetic, optical or inductive interaction.

The mechanical power transmission link can be a shaft or a bushing.

Typically, the limited adjustable angle between the first and the second rotors does not exceed 180 electrical degrees.

The magnetic flux regulator is understood as a regulating electromechanical converter.

The electric machine can be equipped with a magnetic flux sensor that determines the current value of the magnetic flux and with a rotor position sensor.

The claimed invention is described by following drawings.

Figure 1:
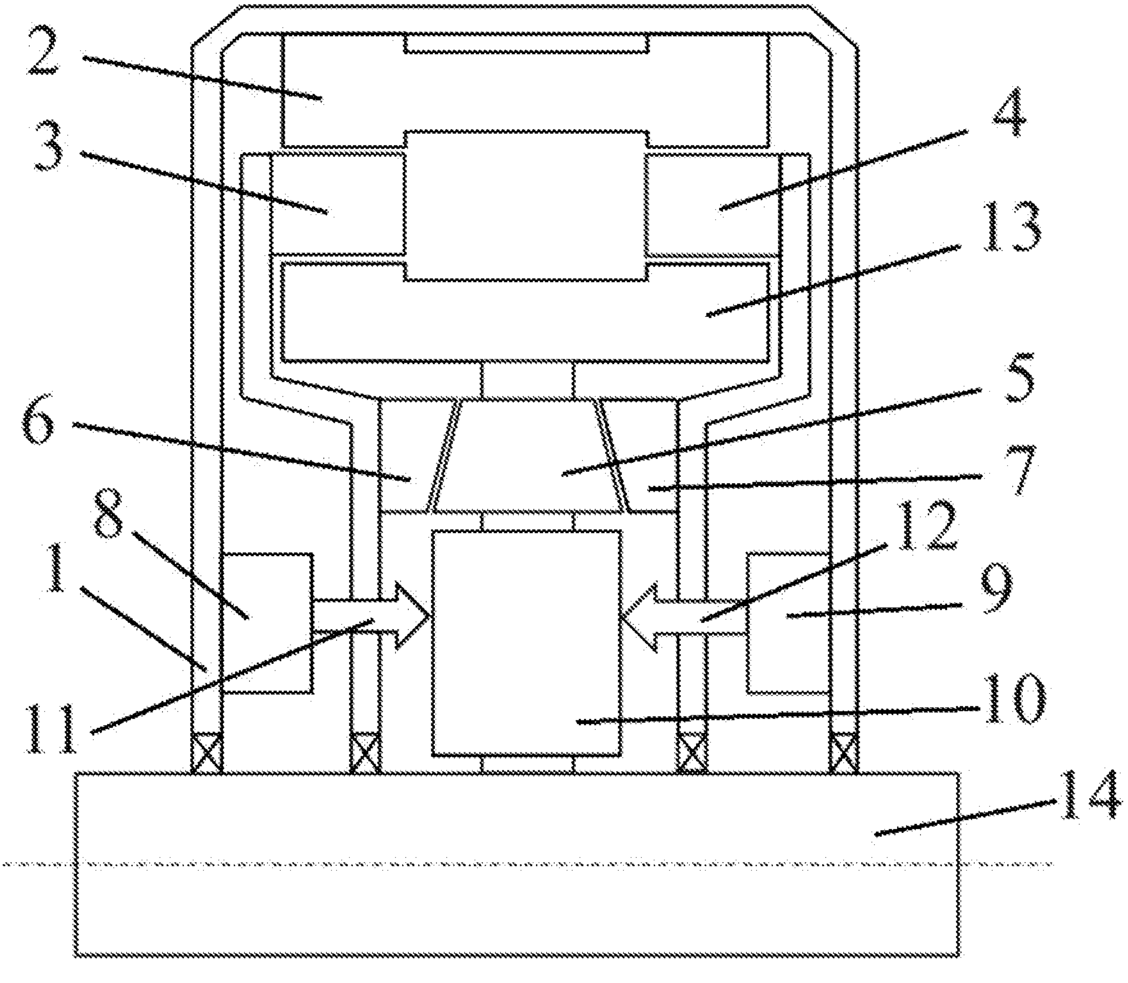
FIG. 1 is a schematic sectional view of an electric machine according to one of the preferred embodiments of the invention.

FIG. 1 illustrates a schematic sectional view of an electric machine according to one of the preferred embodiments of the invention (of one of the two symmetric halves of the section). It can be seen from mentioned figure that the electric machine comprises housing 1 (although it may not comprise its own housing and be mounted in the housing of a device to which the power is transmitted). A stator 2 with windings, a first rotor 3 and a second rotor 4 with permanent magnets are mounted in mentioned housing 1. Mentioned first and second rotors 3 and 4 are mounted with radial gaps relative to the stator 2, furthermore, they are mounted with the ability of mutual rotation relative to each other by a limited adjustable angle and are mounted with an axial gap therebetween that is significantly greater than the radial gaps and is structurally unchanged in the course of operation. The housing 1 also houses a differential comprising a planet pinion 5 determining the mutual rotation of the rotors 3 and 4; a first sun gear 6 and a second sun gear 7, which are fixedly mounted on the first and the second rotors 3 and 4, each wheel being mechanically connected to the planet pinion 5; and a magnetic flux regulator with two nonmoving parts 8 and 9 and one moving part 10. The moving part 10 of the magnetic flux regulator is mechanically coupled to the planet pinion 5 and is configured to contactlessly interact with the nonmoving parts 8 and 9 of the magnetic flux regulator. This interaction is illustrated in the figure by reference numerals 11 and 12. An auxiliary rotor 13 is mounted in the electric machine housing 1 around the inner periphery of the first and the second rotors 3 and 4, wherein, as can be seen in FIG. 1, the stator 2 is mounted around the outer periphery of the first and the second rotors 3 and 4, respectively. The auxiliary rotor 13 is mounted with radial gaps relative to the first and the second rotors 3 and 4, which, in turn, as indicated above, have radial gaps with the stator 2. The auxiliary rotor 13 is fixedly coupled to a mechanical power transmission link 14 in the form of an output shaft. The electric machine also comprises a control system unit (not shown in FIG. 1) associated with the nonmoving parts 8 and 9 of the magnetic flux regulator and with the stator 2. Furthermore, the electric machine can be equipped with a magnetic flux sensor that determines the current value of the magnetic flux and with a rotor position sensor.

Figure 2:
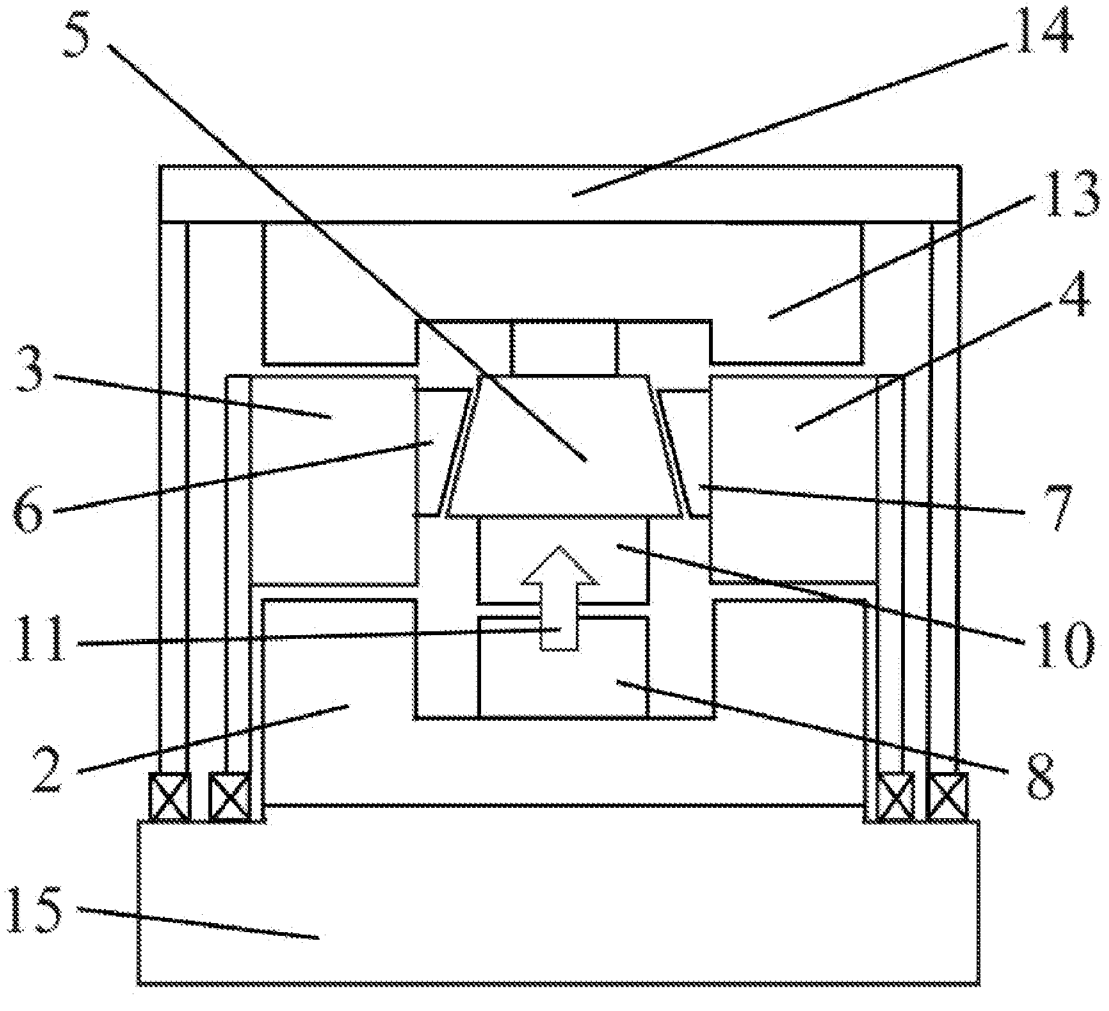
FIG. 2 is a schematic sectional view of an electric machine according to another preferred embodiment of the invention.

The claimed electric machine can be designed with an outer mechanical power transmission link 14, wherein a rotor 13 will be mounted around the outer periphery of a first and a second rotors 3 and 4, and a stator 2 will be mounted around the inner periphery of the first and the second rotors 3 and 4, as illustrated in FIG. 2, which shows a schematic sectional view of an electric machine according to another preferred embodiment of the invention (of one of the two symmetric halves of the section). In mentioned FIG. 2, the elements of the electric machine corresponding to the elements in FIG. 1 are marked accordingly. Reference numeral 15 refers to a non-rotating base.

The operation of the claimed invention is described below by the example of the embodiment of FIG. 1.

In the initial state, the first and the second rotors 3 and 4 in the magnetic circuit with the stator 2 and with the auxiliary rotor 13 are positioned with opposite poles to each other due to the magnetic forces acting in mentioned circuit. This position of the rotors 3 and 4 determines the initial maximum value of the magnetic flux. After supplying alternating voltages to the windings of the stator 2, formed in accordance with the signals from the magnetic flux sensor and the rotor position sensor, if it is present, and external control signals at the input of the control system, the rotors 3 and 4 will begin to rotate around the output mechanical power transmission link 14 (shown as an output shaft in FIG. 1) in one direction, while the planet pinion 5 will move rotationally in a plane that is perpendicular to the axis of the mechanical power transmission link 14, and under the action of the magnetic flux regulator through the mechanical connection with the sun gears 6 and 7 of the rotors 3 and 4, respectively, will rotate the rotors 3 and 4 in opposite directions by an angle, the value of which will depend on the actual rotation speed of the mechanical power transmission link 14 and the counteracting torque from the magnetic forces of interaction of the rotors 3 and 4, taking into account the control input voltage on the nonmoving parts 8 and 9 of the magnetic flux regulator. The actual angular position of the first and the second rotors 3 and 4 will determine the current part from the initial maximum value of the magnetic flux, which is closed to the auxiliary rotor 13 and does not pass through the core with the stator 2 windings and, accordingly, will not generate torque and back electromotive force. Magnetic forces acting in the circuit "rotor 3—stator 2—rotor 4—auxiliary rotor 13" will prevent axial oscillations of the rotors 3 and 4, because the system will naturally keep the shortest magnetic force lines.

Thus, an electric machine is developed, the design of which ensures achievement of a technical result consisting in reducing the axial parasitic mechanical oscillations of the rotors, allows to increase the accuracy and multiplicity of magnetic flux regulation, and also allows to make it easier to control the electric machine.

The invention claimed is:

1. An electric machine comprising:

at least one stator (2) with windings;

a first rotor (3) and a second rotor (4) with permanent magnets, which are mounted with the ability of mutual rotation relative to each other and relative to a mechanical power transmission link (14) by a limited adjustable angle, wherein the number of mentioned pairs of rotors (3, 4) is equal to the number of stators (2);

at least one differential comprising at least one planet pinion (5) mounted with the ability to determine mutual rotation of the first and the second rotors (3, 4);

a first and a second sun gears (6, 7) fixedly mounted on the first and the second rotors (3, 4), each sun gear being mechanically connected to each planet pinion (5);

a magnetic flux regulator with at least one nonmoving part (8, 9) and with at least one moving part (10) mechanically connected to each planet pinion (5) and configured to contactlessly interact with the nonmoving part (8, 9) of the magnetic flux regulator;

the mechanical power transmission link (14) fixedly coupled to the at least one moving part (10) of the magnetic flux regulator;

and a control system associated with the nonmoving part (8, 9) of the magnetic flux regulator and with the stator (2), characterized in that it comprises an auxiliary rotor (13) fixedly connected to the mechanical power transmission link (14), wherein the first rotor (3) and the second rotor (4) are mounted with an axial distance therebetween, wherein the first rotor (3) and the second rotor (4) are mounted between the inner or outer perimeter of the stator (2) and the outer or inner perimeter of the auxiliary rotor (13) with radial gaps, and wherein the stator (2) and the auxiliary rotor (13) have the same axial size, and the sum of the axial lengths of the first and the second rotors (3, 4) and the axial distance therebetween is equal to the axial length of the auxiliary rotor (13).

2. The electric machine according to claim 1, wherein the auxiliary rotor (13) is mounted around the inner periphery of the first and the second rotors (3, 4), and the stator (2) is mounted around the outer periphery of the first and the second rotors (3, 4).

3. The electric machine according to claim 1, wherein the auxiliary rotor (13) is mounted around the outer periphery of the first and the second rotors (3, 4), and the stator (2) is mounted around the inner periphery of the first and the second rotors (3, 4).

4. The electric machine according to claim 1, wherein the first and the second rotors (3, 4) and the auxiliary rotor (13) are mounted with the ability of controllable magnetic flux regulation such that a part of the magnetic flux from the permanent magnets of the first and the second rotors (3, 4), which is proportional to the angle of their mutual rotation, passes through the auxiliary rotor (13) in such a way that it does not interact with the stator (2) windings and does not generate torque and back electro-motive force, thereby preserving the initial phase of the resulting magnetic flux from the first and the second rotors (3, 4) relative to the mechanical power transmission link (14) and the auxiliary rotor (13).

5. The electric machine according to claim 1, wherein the radial gaps between the auxiliary rotor (13) and the first and the second rotors (3, 4) are equal to or smaller than the radial gaps between the first and the second rotors (3, 4) and the stator (2).

6. The electric machine according to claim 1, wherein the contactless interaction is a magnetic, optical or inductive interaction.

* * * * *